US006965931B2

(12) United States Patent
Helms

(10) Patent No.: US 6,965,931 B2
(45) Date of Patent: Nov. 15, 2005

(54) THIN SERVER WITH PRINTER MANAGEMENT

(75) Inventor: Janine L. Helms, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 750 days.

(21) Appl. No.: 09/745,380

(22) Filed: Dec. 18, 2000

(65) Prior Publication Data

US 2002/0078183 A1 Jun. 20, 2002

(51) Int. Cl.[7] .......................................... G06F 15/173
(52) U.S. Cl. ...................... 709/223; 709/203; 709/217; 709/219; 709/223; 358/1.15
(58) Field of Search ................................ 709/220, 226, 709/104, 203, 217, 219, 223; 219/679; 358/1.15

(56) References Cited

U.S. PATENT DOCUMENTS

| | | | | |
|---|---|---|---|---|
| 5,974,234 A | * | 10/1999 | Levine et al. .............. | 358/1.16 |
| 6,121,593 A | * | 9/2000 | Mansbery et al. .......... | 219/679 |
| 6,490,052 B1 | * | 12/2002 | Yanagidaira ............... | 358/1.15 |
| 2003/0218767 A1 | * | 11/2003 | Schroath et al. ........... | 358/1.14 |
| 2004/0156071 A1 | * | 8/2004 | Lay et al. .................. | 358/1.15 |

FOREIGN PATENT DOCUMENTS

GB    2366052 A  *  2/2002  ............ G06F 3/12

* cited by examiner

Primary Examiner—Saleh Najjar
Assistant Examiner—Liang-che Wang

(57) ABSTRACT

A single network appliance combines thin print server functionality with the functionality of network printer administration. The simple rack-mountable appliance has pre-installed software and acts as both a print server and print administrator on a network. The appliance performs as a typical thin print server, such as the Hewlett Packard JetDirect 4000 Print Appliance, and is accessed and managed from any remote computer running a web browser. As a thin print server, the appliance offers typical print spooling and queue functions. Using the single appliance as a print server instead of using a dedicated general purpose server or workstation, reduces the work load on system resources and increases printing performance on a network. In addition to providing thin print server functionality, the single appliance provides printer administration capabilities typically furnished by a general purpose network server installed with print administration software. Hewlett Packard's Web JetAdmin is an example of print administration software commonly installed on a general purpose network server which allows network administrators to perform many tasks associated with managing and monitoring network printers. The single network appliance has pre-installed print administration software which provides a view of all network printers and allows network administrators to create and maintain shared network printers through discovering, installing, configuring, grouping, troubleshooting, assigning printer drivers to, and creating print paths for, network printers. Thus, the single network appliance is a thin server with printer management capabilities that is easily plugged into a network to provide a comprehensive solution to the challenges faced when printing and administering printers in a network environment.

14 Claims, 6 Drawing Sheets

THIN SERVER WITH PRINTER MANAGEMENT

TECHNICAL FIELD

This invention generally relates to network printer management, and, more particularly, to network printer management using a thin server.

BACKGROUND

Computer networks provide computer users with a means of communicating and transferring information electronically. Although such communication may be a simple transfer of information between two users at separate computers, it often involves several network computers which cooperate to share workloads in performing various functions. This cooperation, called distributed processing, allows hardware and software to communicate, share resources, and exchange information freely. The functionality a network provides through distributed processing depends on network devices such as general purpose network servers and thin servers.

Typically, a general purpose network server is a computer running administrative software that controls access to all or part of the network and network resources. As illustrated in FIG. 1, the network server provides network users with the ability to share files, programs, and printing capabilities with other computers on the network. By contrast, a thin server is a computer that contains just enough hardware and software to support a particular function that users can share on the network, such as access to files on a storage device, access to CD-ROM drives, printing, or Internet access. An example of such a thin server is illustrated in the network of FIG. 2. The thin server concept arises out of a desire to not pay for functions in a computer that are unnecessary. Thus, a thin server is specially designed to perform certain aspects of a general purpose network server's functionality and not to provide other aspects of that functionality. In general, a thin server provides a subset of the functionality offered by a general purpose network server. A thin server design is optimized to deliver only the capabilities for which it is designed without including unnecessary software or hardware features related to other general purpose network servers, thus providing a lower cost solution.

The thin server advantages of dedicated functionality and cost savings make the task of network printing an ideal application for thin servers. The thin print server shown in FIG. 2 is dedicated to the task of network printing, and it provides cost benefits due in part to its small, lightweight form which makes it easy to move and locate practically anywhere on the network. Many networks therefore employ a dedicated thin print server which coordinates the printing for all the printers on the network. The Hewlett Packard JetDirect 4000 Print Appliance is one example of such a thin server. The JetDirect 4000 Print Appliance provides print spooling and queue management without providing any other capabilities normally provided by a general purpose network server. The device is called an "appliance" because it performs this particular task with a minimal amount of configuration requirements and can be added to or removed from a network without affecting any other servers on the network.

Although a thin print server performs specific functions for users of network printers more efficiently than a general network server might, it does not initially provide, or later maintain, the availability of the network printers on the network. Network administrators make network printers and other network resources available to users in a consistent and reliable fashion by installing, managing, and monitoring them to ensure their readiness and accessibility. These administrative tasks are typically accomplished using administrative software installed on a general network server. Both FIGS. 1 & 2 illustrate network printer administration functions being accomplished through print administrative software that has been installed on a general network server. An example of such a software product is Hewlett Packard's Web JetAdmin, which is installed on a general purpose network server and allows network administrators to perform many tasks associated with managing and monitoring network printers. Using a browser, network administrators can manage printers on the network from any network computer, not just the computer on which the Web JetAdmin software is installed. Web JetAdmin presents a summarized view of all network printers to a network administrator, and allows administrators to create and maintain shared network printers through discovering, installing, configuring, grouping, troubleshooting, assigning printer drivers to, and creating print paths for, network printers.

The current network printing environment therefore typically comprises the separate use of thin print servers to coordinate printing (i.e., provide print spooling and queue management) among all shared network printers, and print administrative software running on general purpose network servers or other dedicated computers to create and maintain shared network printers to ensure their readiness and accessibility for network users. Although network printing has in general been simplified and improved through this manner of network printer management, numerous disadvantages remain using this approach.

First of all, installation of the print administrative software on a customer's general network server, as illustrated in FIGS. 1 & 2, creates the common risks of general network server downtime and inadvertent damage to current network servers usually associated with a bad installation of the software. A security risk also exists when installing the print administrative software onto an existing server on a customer's network from the possible creation of a "back door" into network servers, allowing users unauthorized access to server functions normally reserved for network administrators. In addition, network server load balancing issues occur when installing the print administrative software onto a customer's network which require a customer to identify and select a server already on their network that can provide the disk space, memory resources, and CPU resources required to run the software package. The additional work load placed on the general network server decreases its performance and speed. Installation of the print administrative software on a customer's general purpose network server also requires a specific configuration of the software in order to match the customer's network design, rather than just a general out-of-the-box or one-size-fits-all configuration of the print administrative software.

One solution to these various problems, as illustrated by the network of FIG. 3, would be to dedicate a separate, general purpose server or computer to handle both the thin print server functions and the network printer administrative functions. This way, installation of the print administrative software on the dedicated server or computer avoids the problems of general network server downtime, decreased performance in a general network server, and increased security risks to general network servers. However, the disadvantages to such a solution include the added costs of having to purchase and maintain a separate general purpose server or computer strictly for the purpose of acting as a print server and network print administrator. This alternative also requires finding room in which to place the added server or computer and increases the cost for energy to keep it running continuously. In addition, should the server or computer go down, it would need to be replaced and reconfigured before users are able to print again. These tasks require significant additional intervention by the network administrator.

Accordingly, the need exists for a cost effective way to provide general management of network printers and accomplish the tasks of a thin print server in coordinating network printer functions, while avoiding disadvantages suffered by current approaches.

SUMMARY

A single network appliance combines thin print server functionality with the functionality of network printer administration. The simple rack-mountable appliance has pre-installed software and acts as both a print server and print administrator on a network. The appliance performs as a typical thin print server, such as the Hewlett Packard JetDirect 4000 Print Appliance, and is accessed and managed from any remote computer running a web browser. As a thin print server, the appliance receives and stores client print jobs in a queue and then forwards the print jobs on to network printers once the printers are available. In addition, the appliance offers other typical print server features such as queue management, job logs, printer setup, and storage of files for later printing, which facilitate the simple and efficient sharing of network printers. Using the single appliance as a print server instead of using a dedicated general purpose server or workstation, reduces the work load on system resources and increases printing performance on a network. In addition to providing thin print server functionality, the single appliance provides printer administration capabilities typically furnished by a general purpose network server installed with print administration software. Hewlett Packard's Web JetAdmin is an example of print administration software commonly installed on a general purpose network server which allows network administrators to perform many tasks associated with managing and monitoring network printers. The single network appliance has pre-installed print administration software which provides a view of all network printers and allows network administrators to create and maintain shared network printers through discovering, installing, configuring, grouping, troubleshooting, assigning printer drivers to, and creating print paths for, network printers. Thus, the single network appliance is a thin server with printer management capabilities that is easily plugged into a network to provide a comprehensive solution to the challenges faced when printing and administering printers in a network environment.

DETAILED DESCRIPTION

Exemplary Computing Environment

Figure 1:
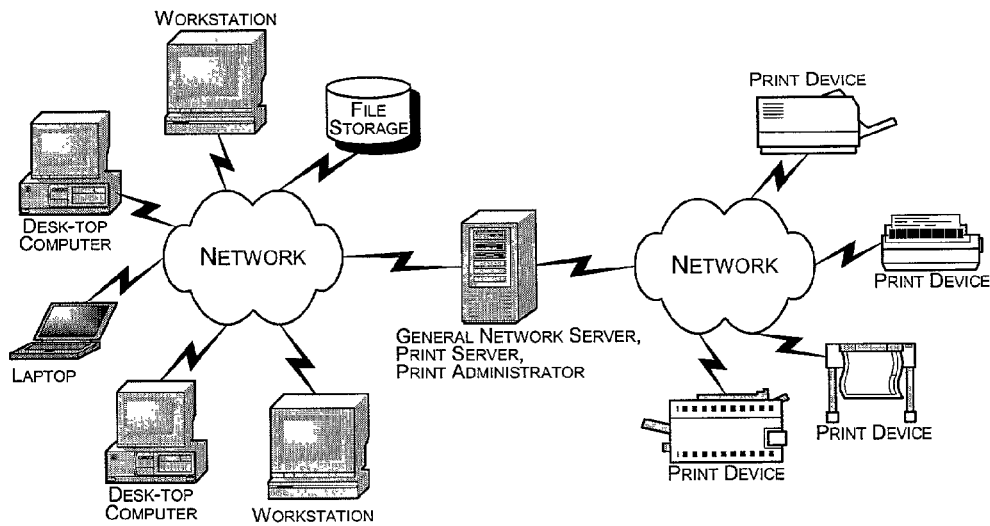
FIG. 1 illustrates a prior art computer network where a general purpose network server performs file server functions, network printer administration functions, and typical print server functions.
Figure 2:
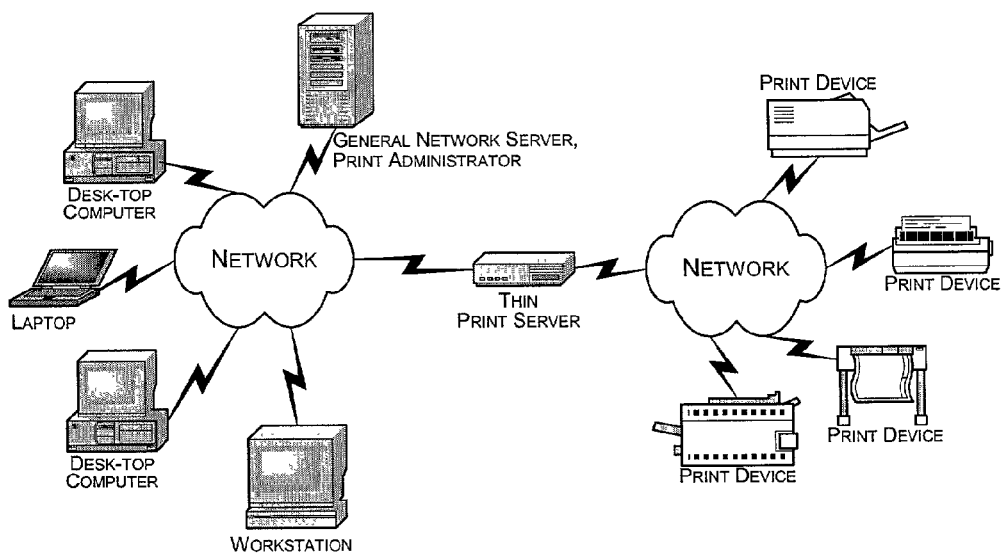
FIG. 2 illustrates a prior art computer network where a general purpose network server performs network printer administration functions while a dedicated thin server performs typical print server functions.
Figure 3:
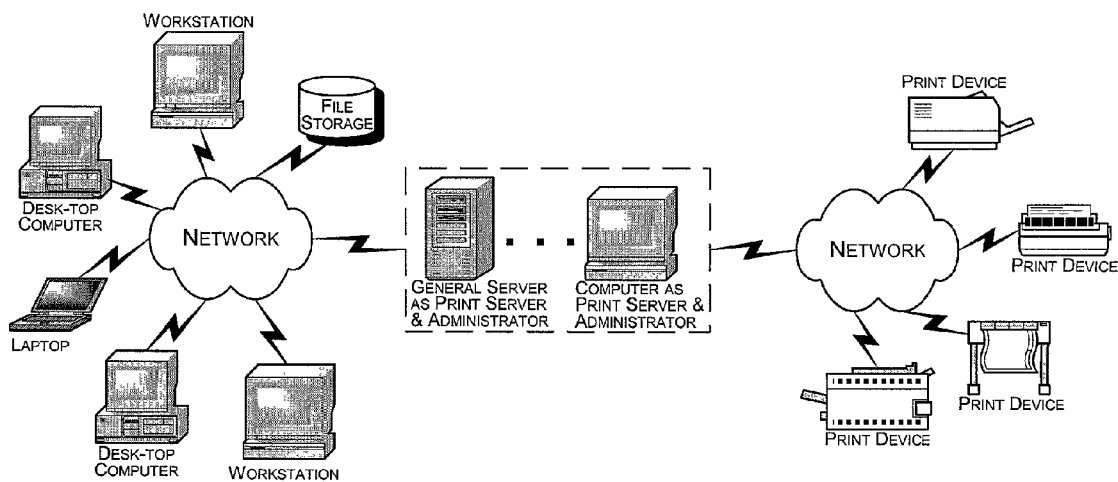
FIG. 3 illustrates a prior art computer network where a separate general purpose network server or computer is dedicated to perform both network printer administration functions and typical print server functions.
Figure 4:
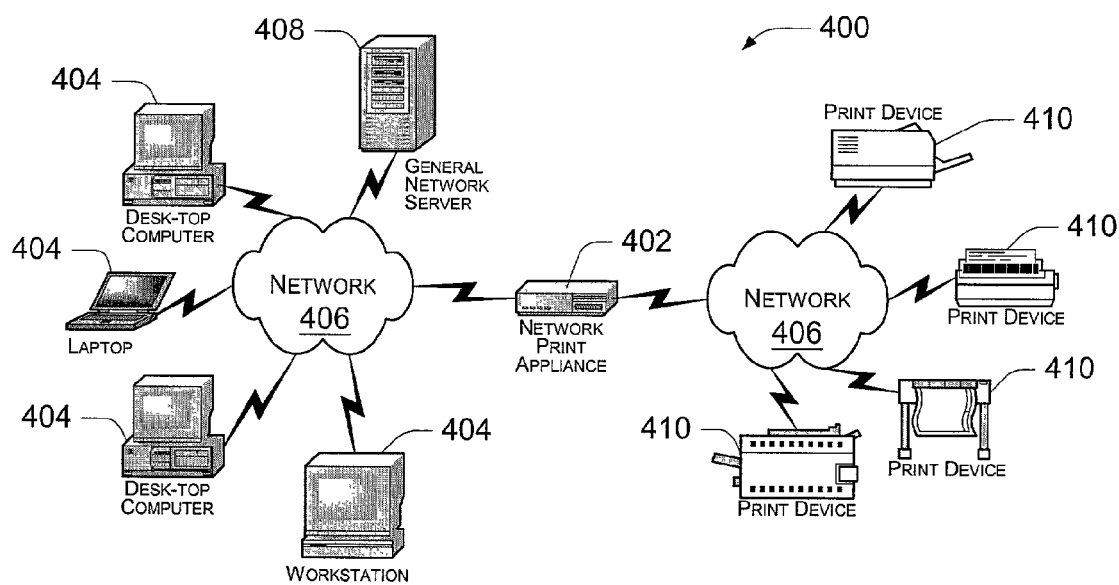
FIG. 4 illustrates an exemplary network architecture in which a network print appliance may be implemented.

FIG. 4 illustrates an exemplary network architecture 400 in which a network print appliance 402 may be implemented. The network architecture 400 permits users at various client computing devices 404 to access printing services via a network 406, such as an intranet. The exemplary network architecture 400 for implementing the network print appliance 402 includes general purpose computing devices 404 such as desktop, laptop, palmtop, Macintosh and workstation computers, one or more general purpose network file servers 408, and various printing devices 410, operating in a networked environment using logical connections to one another. The network print appliance 402 is not limited to implementation in a particular network environment, and can be implemented using various networks including an intranet, the Internet, a wide area network (WAN), and a local area network (LAN).

Figure 5:
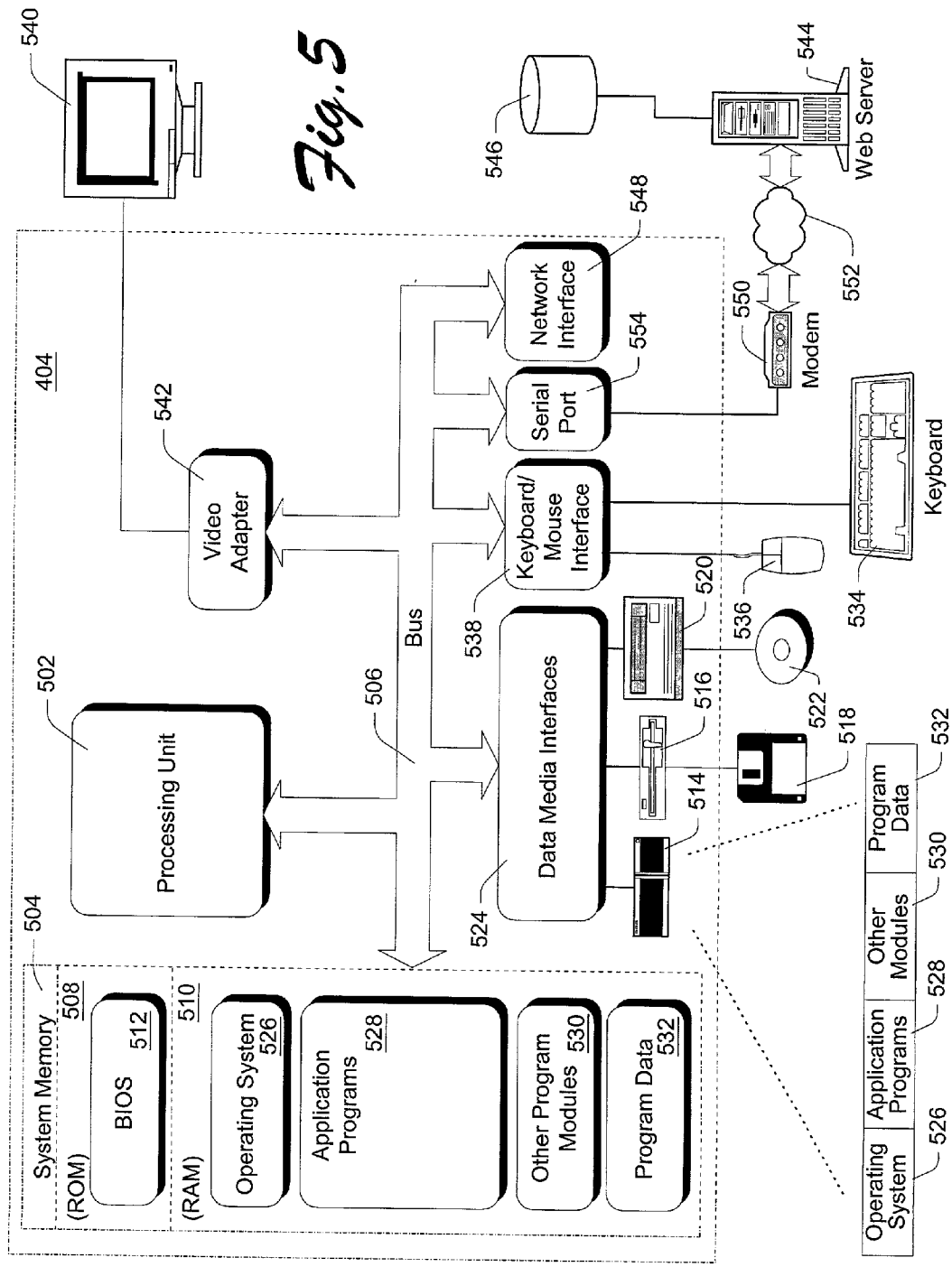
FIG. 5 illustrates an example of a suitable computing environment in which a network print appliance may be implemented.

FIG. 5 illustrates an example of a suitable computing environment in which a network print appliance 402 may be implemented. The computer 404 may be a network device such as a server or database, or any type of general purpose computing device 404 as mentioned above, having a communications link to a network 406 as in the exemplary network architecture 400 of FIG. 4.

As shown in FIG. 5, computer 404 includes one or more processors or processing units 502, a system memory 504, and a bus 506 that couples various system components including the system memory 504 to processor(s) 502. Bus 506 represents one or more of any of several types of bus structures, including a memory bus or memory controller, a peripheral bus, an accelerated graphics port, and a processor or local bus using any of a variety of bus architectures.

The system memory includes read only memory (ROM) 508 and random access memory (RAM) 510. A basic input/output system (BIOS) 512, containing the basic routines that help to transfer information between elements within computer 404, such as during start-up, is stored in ROM 508.

Computer 404 further includes a hard disk drive 514 for reading from and writing to a hard disk, not shown, a magnetic disk drive 516 for reading from and writing to a removable magnetic disk 518, and an optical disk drive 520 for reading from and writing to a removable optical disk 522 such as a CD ROM, DVD ROM or other optical media. The hard disk drive 514, magnetic disk drive 516 and optical disk drive 520 are each connected to bus 506 by one or more interfaces 524.

The drives and their associated computer-readable media provide nonvolatile storage of computer readable instructions, data structures, program modules and other data for computer 404. Although the exemplary environment described herein employs a hard disk, a removable magnetic disk 518 and a removable optical disk 522, it should be appreciated by those skilled in the art that other types of computer readable media which can store data that is accessible by a computer, such as magnetic cassettes, flash memory cards, digital video disks, random access memories (RAM), read only memories (ROM), and the like, may also be used in the exemplary operating environment.

A number of program modules may be stored on the hard disk, magnetic disk 518, optical disk 522, ROM 508, or RAM 510, including an operating system 526, one or more application programs 528 (such as a Web browser), other program modules 530, and program data 532. A user may enter commands and information into computer 404 through input devices such as keyboard 534 and pointing device 536. Other input devices (not shown) may include a microphone, joystick, game pad, satellite dish, scanner, or the like. These and other input devices are connected to the processing unit 502 through an interface 538 that is coupled to bus 506.

A monitor 540 or other type of display device is also connected to bus 506 via an interface, such as a video adapter 542. In addition to the monitor, personal computers typically include other peripheral output devices (not shown) such as speakers and printers.

Computer 404 can operate in a networked environment, such as that shown in FIG. 4, using logical connections to one or more remote computers. Remote computers may include a Web server 544 which typically comprises many or all of the elements described above relative to computer 404. In addition, a Web database 546 may be connected to the Web server 544.

A logical connection that is not depicted in FIG. 5 is a local area network (LAN) via network interface 548 and a general wide area network (WAN) via a modem 550. Such networking environments are commonplace in offices, enterprise-wide computer networks, intranets, and the Internet.

Depicted in FIG. 5, is a specific implementation of a WAN via the Internet. Computer 404 typically includes a modem 550 or other means for establishing communications over the Internet 552. Modem 550, which may be internal or external, is connected to bus 506 via interface 554.

In a networked environment, program modules depicted relative to the computer 404, or portions thereof, may be stored in a remote memory storage device. It will be appreciated that the network connections shown and described are exemplary and other means of establishing a communications link between the computers may be used.

Exemplary Implementation of a Network Print Appliance

The network print appliance 402 operating in the exemplary network architecture 400 of FIG. 4 includes many of the elements described above relative to computer 404 in FIG. 5. However, as a thin server, the network print appliance 402 is optimized to deliver only the capabilities for which it is designed, without including unnecessary software or hardware features related to other general purpose network servers or computers. For example, the network print appliance 402 is designed to be accessed, managed, and utilized from remote locations only, such as from a remote computer 404 or remote server 408, and therefore provides no physical user interface. Thus, elements described above pertaining to computer 404 that are typically not a part of the appliance 402 include various input devices, such as the keyboard 534, pointing device 536, microphone, joystick, game pad, satellite dish, scanner, and the like. Other elements described above pertaining to computer 404 which are not typically a part of the network print appliance 402 include the display device and other peripheral output devices such as speakers.

Figure 6:
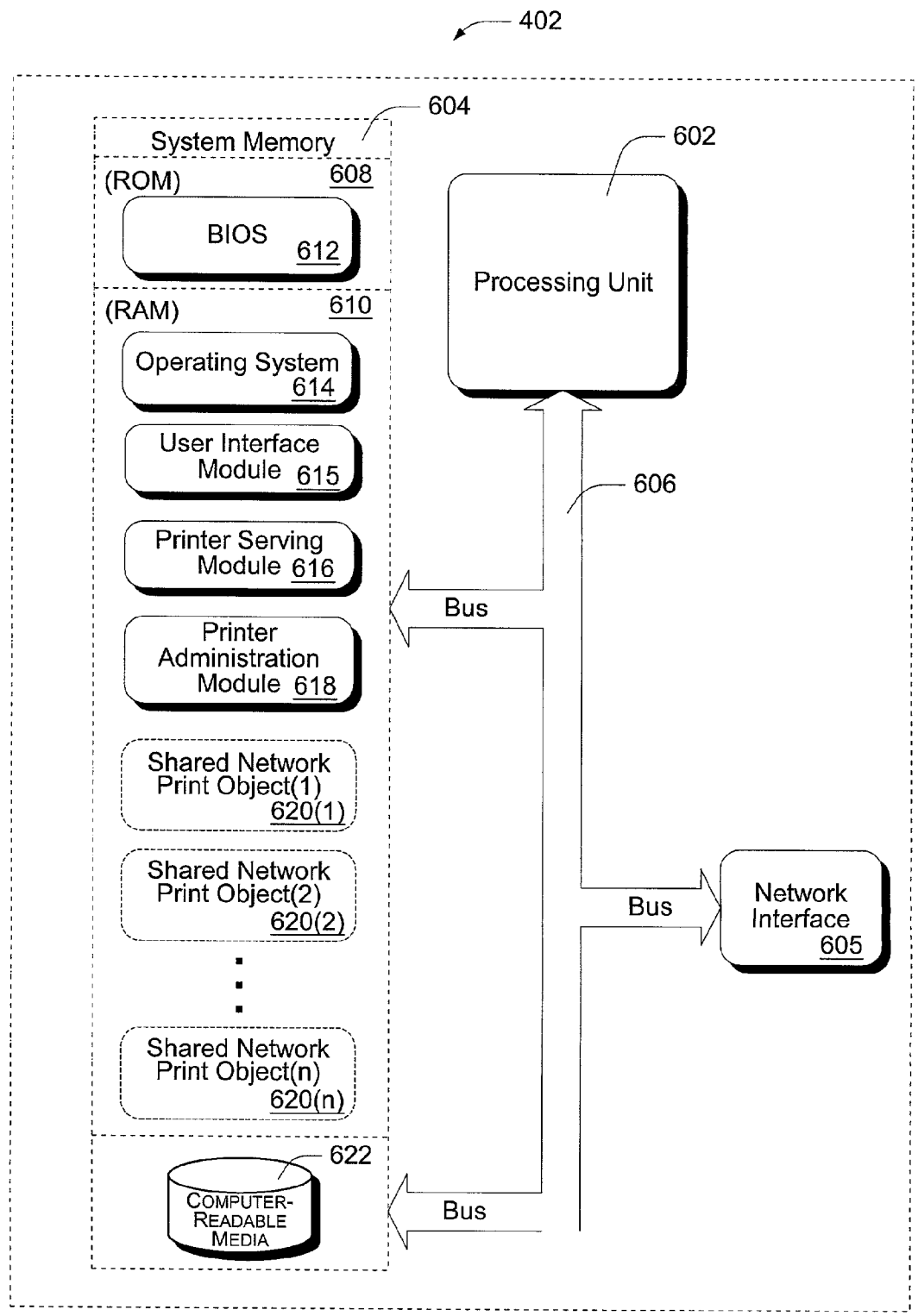
FIG. 6 illustrates an exemplary network print appliance having processors, system memory, and a bus that couples various system components.

The network print appliance 402 is a thin server dedicated to the specific tasks of print serving and network printer administration. An exemplary network print appliance 402, as illustrated in FIG. 6, includes one or more processors or processing units 602, a system memory 604, a network interface 605 such as a network interface card providing full-time connection to the network 406, and a bus 606 that couples various system components including the system memory 604 to processor(s) 602. The system memory 604 includes read only memory (ROM) 608 and random access memory (RAM) 610. A basic input/output system (BIOS) 612, containing the basic routines that help to transfer information between elements within the appliance 402, such as during start-up, is stored in ROM 608. The network print appliance 402 typically includes additional computer-readable media 622, such as magnetic disks, optical disks, magnetic cassettes, flash memory cards, and the like, for spooling print jobs and storing other data.

As illustrated in FIG. 6, the exemplary network print appliance 402 has a number of program modules stored in the system memory 604, including an operating system 614, a user interface module 615, a printer serving module 616, and a printer administration module 618. The user interface module 615 facilitates remote browser based user management of the network print appliance 402, including the initiation and operation of the printer serving module 616 and printer administration module 618 on the appliance 402. All the program modules are pre-installed on the appliance 402, which facilitates deployment of the network appliance 402 as a single, stand-alone hardware appliance. The typical problem of having to deploy both software and hardware on a network to achieve network printer administration and print serving is thus eliminated.

In addition, pre-installation of the printer administration module 618 on the network print appliance 402 means the printer administration module 618 only needs to support the operating system 614 required by the network print appliance 402 itself. Typical printer administration software products must support many versions of many operating systems to ensure that they will be supported by the particular operating system available on the network operating environment in which they are ultimately installed. Since the printer administration software module 618 is pre-installed onto the network print appliance 402, whose operating system 614 is known at the time of the installation, the complexity of the printer administration software module 618 is reduced in comparison to typical printer administration software products. Furthermore, pre-installation of the printer administration module 618 on the appliance 402, reduces both the risk of general network server downtime and the security risk of creating a "back door" into the general network server associated with installing print administrative software on a general network server. Pre-installation of the printer administration module 618 on the appliance 402 also eliminates the network administrator's tasks of network server load balancing and configuring printer administration software to match a particular network. The printer administration module 618 comes pre-configured on the network print appliance 402.

The printer administration module 618 executes on processor(s) 602 to provide general administration of the print devices 410 connected to the network 406, as illustrated in FIG. 4. Network administrators access and manage the print appliance 402 through the user interface module 615 using network computers 404 or servers 408 running Web browsers. In general, the printer administration module 618 executes on processor(s) 602 permitting the creation of shared network print objects 620 from the print devices 410 connected to the network 406. Creating a shared network print object 620 creates a network share name for a printer device 410 which becomes visible to users of remote client computers 404, thus making the printer device 410 a choice for where the user can have documents printed. Each of the shared network print objects 620 represents a print queue in which print jobs are managed for printing. Typically, printer administration software products provide the ability to create shared network print objects on any general-purpose network file server 408 or computer 404 on the network. This includes creating shared network print objects on servers other than the one on which the printer administration software is installed. In the exemplary network print appliance 402, the printer administration module 618 prohibits the creation of shared network print objects on any network server or computer except for the network print appliance 402 itself. Limiting the creation of shared network print objects 620 to the network print appliance 402 alone, is a feature which provides network administrators with better control over the creation of and access to all network resources.

The printer administration module 618 executes to perform additional tasks which facilitate the creation and management of shared network print objects 620 on the network print appliance 402. These tasks include discovering print devices 410 connected to the network 406. A network administrator can access the appliance 402 from a network computer 404, and, through execution of the printer administration module 618, can discover print devices 410 that are connected to the network 406. The administrator can then determine which print devices 410 should be shared over the network 406, and create shared network print objects 620 on the network print appliance 402. Additional related tasks performed through execution of the printer administration module 618 include installing, configuring, monitoring, troubleshooting, and grouping printers. Shared network print objects 620 can be defined in groups on the network print appliance 402 to facilitate the use and maintenance of the network print devices 410 they represent. For example, shared network print objects 620 might be grouped based on the physical or geographical location of network print devices 410, or they might be grouped based on the administrator who is responsible to maintain the paper quantities, toner levels, and general functionality of the network print devices 410.

The printer administration module 618 also allows the network administrator to assign printer drivers and establish print paths for network printers 410.

In general, the printer administration module 618 might be any one of a number of commercially available printer administration software products that is, (1) modified to support only the operating system 614 on the network print appliance 402; (2) modified to create shared network print objects 620 only on the network print appliance 402 itself, and not on any general purpose network server 408 or computer 404; and (3) pre-installed on the network print appliance 402, and not installed on a general network server 408 or computer 404 as discussed above. Thus, an example of a preferred implementation of the printer administration module 618 includes a modified version of Hewlett Packard's Web JetAdmin software product, pre-installed on the network print appliance 402.

The printer serving module 616 executes on processor(s) 602 to provide thin print server functionality to the network print appliance 402 in a network environment 400 such as that illustrated in FIG. 4. As a thin print server, the network print appliance 402 provides print spooling and queue management independent of the general network server 408. Print spooling includes receiving print jobs from network computers 404, processing the print jobs, scheduling the print jobs for printing, and routing the print jobs from the network print appliance 402 to one or more network print devices 410 which have been created as shared network print objects 620 on the network print appliance 402 by the printer administration module 618. Print spooling automates the background printing for network computers 404 by quickly releasing the computers after receiving a print job and by sending print data to shared network print devices 410 only when they are ready to receive it.

In addition to print spooling, the printer serving module 616 executing on the network print appliance 402 provides management of print queues. A print queue is a series of print jobs waiting to be sent to a printing device 410. The printer serving module 616 executing on the network print appliance 402 provides typical queue management features, such as the ability to manage multiple queues both for the same printer or different printers. The network print appliance 402 may additionally have different queues for an individual shared network print device 410, which permits associating specific printer options for each queue. For example, different queues for the same printer may be set to provide different print resolutions. Other features may include providing different types of queues. These may include active queues, where jobs print when the printer is available, hold queues, where jobs print when an administrator releases them, completed queues, where printed jobs are stored for later reprinting, and error queues, for jobs that cannot print for any reason.

Generally, the printer server module 616 might be any one of a number of commercially available thin print server software products that provide print spooling and queue management independent of a general network server 408. For example, a preferred implementation of the printer server module 616 is the Hewlett Packard JetDirect 4000 Print Appliance.

Therefore, a preferred implementation of the network print appliance 402 includes the Hewlett Packard JetDirect 4000 Print Appliance executing the printer server module 616 along with a pre-installed version of the Hewlett Packard Web JetAdmin software product modified to, (1) support only the operating system 614 on the network print appliance 402, and (2) create shared network print objects 620 only on the network print appliance 402 itself, and not on any general-purpose network server 408 or computer 404. The network print appliance 402 thus combines both thin print server functionality with network printer administration functionality, while retaining the small, lightweight, cost saving, characteristics common with most thin servers. This, and the minimal configuration required by the network print appliance 402, make it easy to move and install practically anywhere on the network without affecting any other servers on the network.

Exemplary Method of Operation for a Network Print Appliance

Figure 7:
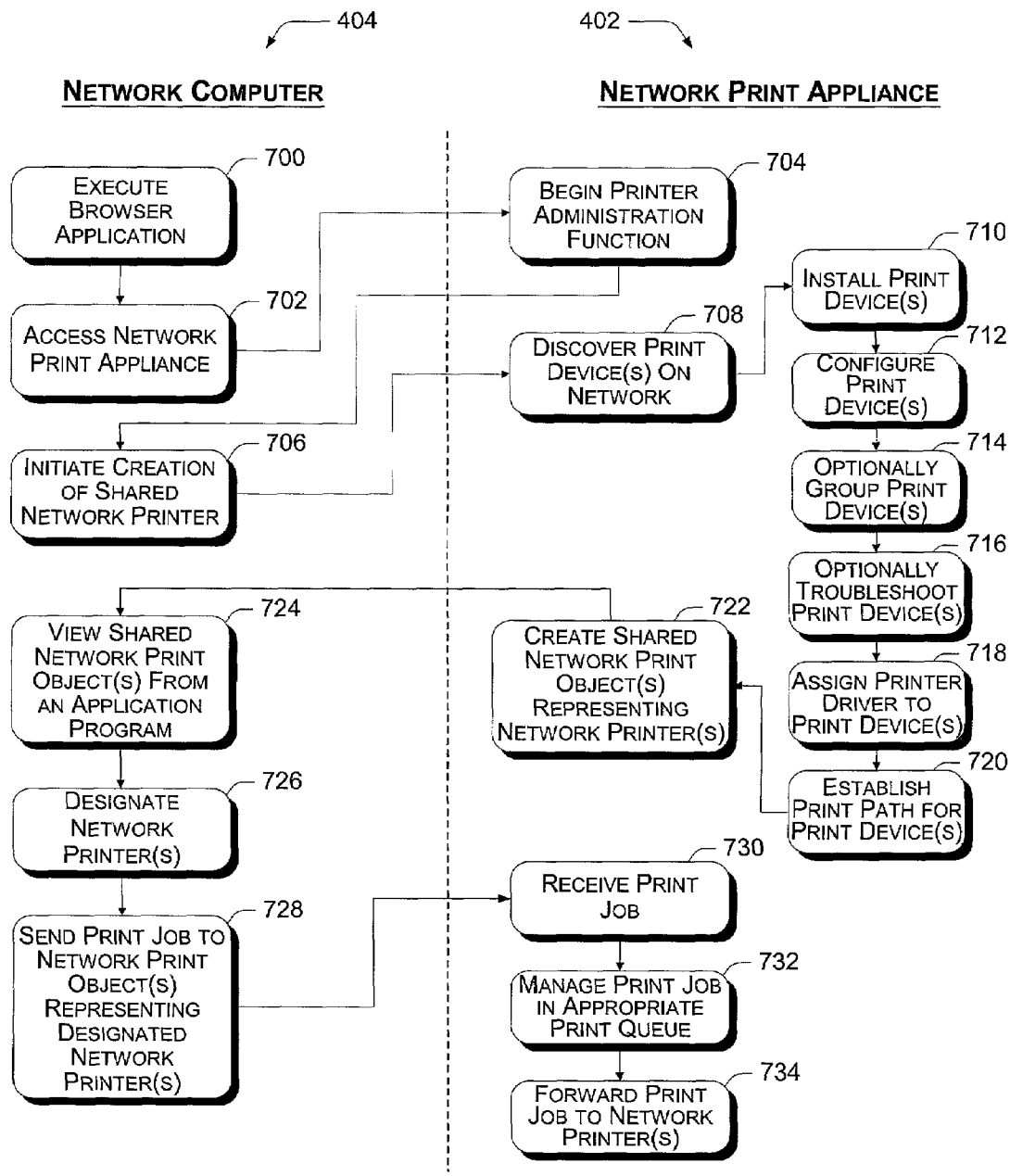
FIG. 7 is a flow diagram illustrating the general operation of an exemplary network print appliance.

Having introduced the network print appliance 402 in an exemplary operating environment, an example method of operation will be presented with primary reference to FIG. 7. FIG. 7 is a flowchart illustrating the general operation of the network print appliance 402.

Beginning at operation 700, a network administrator executes a Web browser on a network computer 404. As indicated throughout this description, a network computer 404 may be any general purpose computing device such as a desktop, laptop, palmtop, Macintosh or workstation computer, or a network file server. At operation 702, the administrator accesses the network print appliance 402 to begin management of network printers through execution of a printer administration software module 618 at operation 704. The administrator can then initiate the creation of shared network print objects 620 at operation 706 using the network print appliance 402. At operation 708 the network print appliance 402 discovers print devices 410 that are connected to the network and can create shared network print objects 620 on the network print appliance 402 by installing and configuring the network print devices 410 at operations 710 and 712 respectively. The administrator has the option of grouping network print devices 410 as described above, at operation 714, and can troubleshoot print devices if necessary at operation 716. Printer drivers are assigned to print devices at operation 718, and print paths are established at operation 720. These tasks in general are performed only by network administrators having high level access to the creation and management of network resources. Thus, network administrators, rather than general network users, are typically responsible for creating the shared network print objects 620 (operation 722). Moreover, the network print appliance 402 allows any one or all of these operations to be performed by an administrator at any time in order to continually maintain the readiness and accessibility of network printers for network users.

At operation 724, network users and administrators can view the shared network print objects 620 representing the network print devices 410 while executing application programs on remote network computers 404 or servers 408. Users can designate a network print device 410 to print to at operation 726, and can send a print job to the shared network print object 620 representing that printer at operation 728. The network print appliance 402 receives the print job from the network computer 404 at operation 730 and manages the print job in the appropriate print queue for the designated print device at operation 732. Typically, when the print device designated for completing the print job is free or available, the network print appliance 402 forwards the print job to the print device at operation 734.

What is claimed is:

1. A thin print server having no physical user interface, the thin print server comprising:
    one or more processors;
    a memory associated with the one or more processors;
    a network interface providing full-time connection to a network and remote access to the thin print server by one or more client computers;
    a user interface module stored in the memory and executable on the one or more processors providing remote management of the thin print server by the one or more client computers, the user interface module precluding local management of the thin print server;
    a printer administration module stored in the memory and executable on the one or more processors for discovering one or more printers connected to the network and creating one or more shared network print objects, each shared network print object representing a printer connected to the network as a shared network printer; and
    a printer serving module stored in the memory and executable on the one or more processors for receiving print jobs, managing print queues, and forwarding print jobs to a shared network printer for printing.

2. A thin print server as recited in claim 1, wherein creating one or more shared network print objects further comprises:
    installing a printer;
    configuring the printer;
    assigning a printer driver to the printer;
    monitoring the printer;
    grouping the printer;
    troubleshooting the printer; and
    establishing a print path for the printer.

3. A thin print server as recited in claim 1, wherein the printer administration module is required to create the one or more shared network print objects on the thin print server, thereby preventing the creation of a shared network print object on any other network device.

4. A thin print server as recited in claim 1, wherein the printer administration module is pre-installed on the thin print server and supports a single operating system, the single operating system being the thin print server operating system.

5. A thin print server as recited in claim 1, wherein the network interface is a Web browser based interface.

6. A system for printing over a network, comprising:
    one or more client computers;
    one or more network printers;
    a thin print server having no physical user interface but having a network interface providing full-time connection to a network and remote access to the thin print server by the one or more client computers;
    the thin print server being configured to discover the one or more network printers and create one or more shared network print objects, each shared network print object representing a network printer connected to the network as a shared network printer;
    the one or more client computers being configured to access and manage the thin print server through a Web browser;
    the one or more client computers being further configured to designate a shared network print object and send a print job to the designated shared network print object while executing an application program;
    the thin print server being further configured to receive a print job, manage print queues, and forward a print job to a shared network printer for printing.

7. A system as recited in claim 6, wherein creating one or more shared network print objects further comprises:
    installing a network printer;
    configuring the network printer;
    assigning a printer driver to the network printer;
    monitoring the network printer;
    grouping the network printer;
    troubleshooting the network printer; and
    establishing a print path for the network printer.

8. A system as recited in claim 6, wherein the thin print server is required to create the one or more shared network print objects on the thin print server itself, thereby preventing the creation of a shared network print object on any other network device.

9. A system as recited in claim 6, wherein the thin print server comprises a printer administration module for discovering the one or more network printers and creating the one or more shared network print objects, the printer administration module being pre-installed on the thin print server and supporting a single operating system, the single operating system being the thin print server operating system.

10. A system as recited in claim 6, wherein the network interface is a Web browser based interface.

11. A method of printing over a network, comprising:
accessing a thin print server having no physical user interface from a remote computer;
through the remote computer, managing the thin print server such that the thin print server discovers one or more printers connected to the network and creates one or more shared network print objects, each shared network print object representing a printer connected to the network as a shared network printer;
designating a shared network print object from an application program executing on the remote computer;
sending a print job from the remote computer to the designated shared network print object for printing;
receiving the print job at the thin print server;
managing the print job at the thin print server in one or more print queues; and
forwarding the print job from the thin print server to a shared network printer for printing.

12. The method of claim 11, further comprising:
remotely managing the thin print server to perform:
installing a printer;
configuring the printer;
assigning a printer driver to the printer;
monitoring the printer;
grouping the printer;
troubleshooting the printer; and
establishing a print path for the printer.

13. The method of claim 11, wherein the thin print server is required to create the one or more shared network print objects on the thin print server itself, thereby preventing the creation of a shared network print object on any other network device.

14. The method of claim 11, wherein managing the print job at the thin print server in one or more print queues further comprises:
associating a printer option with a print queue;
holding a print job until a shared network printer is available;
holding a print job until a network administrator releases the print job; and
storing a print job that cannot print.

* * * * *